Patented Dec. 18, 1951

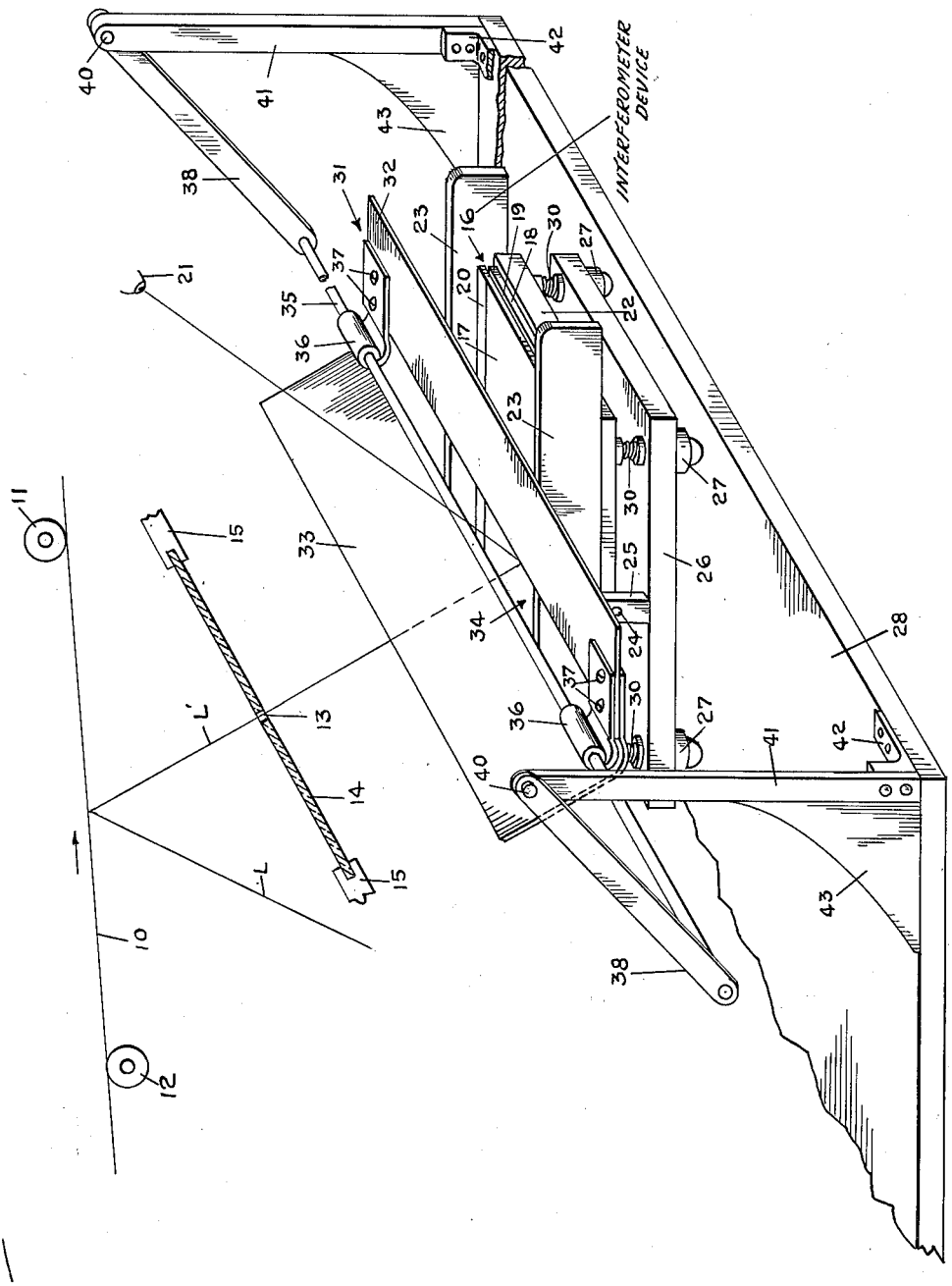

2,578,859

UNITED STATES PATENT OFFICE 2,578,859

LIGHT DIRECTING MEANS IN A SYSTEM FOR MEASURING THICKNESS OF TRANSPARENT SHEETS

John H. Teeple, Caldwell, N. J., and Allen Strickler, Los Angeles, Calif., assignors to Celanese Corporation of America, New York, N. Y., a corporation of Delaware Application June 24, 1949, Serial No. 101,114

7 Claims. (Cl. 88—14)

1

This invention relates to an optical measuring system and relates more particularly to an optical measuring system including an interferometer for the measurement of the thickness of transparent or relatively transparent films, foils and other sheet materials.

The accurate measurement of the thickness of thin sheet materials has heretofore been a difficult problem, particularly when said sheet materials are in the form of a moving web which requires a continuous gauging of its thickness. One of the major difficulties in effecting continuous gauging lies in the fact that the usual measuring devices required some contact of the measuring means with one or both surfaces of the sheet material. When the films and foils are formed by casting operations employing a volatile solvent, or by extrusion and coagulation as in the case of regenerated cellulose, surface contact is undesirable since the films and foils are quite soft after being formed and are easily scored or otherwise marred.

We have found, however, that the measurement of the thickness of films and foils without surface contact may be achieved readily by the use of interferometric methods. In accordance with our process, a beam of light is caused to strike a transparent or semi-transparent film or foil and to produce reflected beams from the near and far faces of the film or foil which are out of phase by a distance which is a function of the thickness of the film or foil. The out of phase light beams are then caused to travel an optical path including an optical wedge which intercepts the out of phase light beams and brings them back into phase forming an interference pattern where the thickness of the optical wedge coincides substantially with the thickness of the film or foil. By suitably calibrating the optical wedge and providing a scale therefor, the position of the interference pattern may be utilized to indicate the thickness of the film or foil, the numerical value of thickness being read directly from said scale. Thus, direct contact with the film or foil is avoided and the thickness thereof is capable of being determined by our measuring system with a very high degree of accuracy. The interference fringes are ordinarily not very easily located or recognized without some training and experience on the part of the operatives using said interferometer. The difficulties are even greater when the optical wedge must be shifted from one position to another when gauging the thickness of a rather wide sheet of material.

It is, therefore, an important object of this invention to provide means for mounting an interferometer in an optical measuring system for the direct measurement of the thickness of films, foils or other transparent sheet materials by interferometric means whereby said interferometer may be readily shifted from point to point without impairing the efficiency thereof, i. e. the ease with which thickness readings may be taken.

Another object of this invention is to provide means adapted to be employed in connection with an interferometric thickness measuring device which improves interference fringe visibility and increases the ease of sighting and reading.

Other objects of this invention will appear from the following detailed description and the accompanying drawing.

In the drawing, the figure is a view, in perspective, of a preferred embodiment of our novel interferometer mounting and improved sighting means.

Referring to the drawing, there is shown a film 10, formed of any suitable transparent or semi-transparent material moving in the direction indicated by the arrow and formed by a suitable film-casting or extrusion operation. Film 10 is guided in a given path by a pair of guide rollers 11 and 12 and is directed to suitable reeling or take-up means (not shown). In order to measure the thickness of the film 10, a beam of diffused white light L, from a suitable source, is directed toward film 10. Light beam L is caused to strike film 10 and is reflected therefrom as a beam L'. The latter light beam actually consists of two slightly out of phase beams, but is shown as a single beam in the interest of clarity. Reflected beams L' pass through a slit 13 in a window 14, formed of a suitable opaque material, which is suitably mounted in a housing 15, which housing normally encloses the entire casting operation so as to prevent dust, dirt, etc., from setting on the film during its formation.

Light beams L' are then caused to strike an optical wedge generally indicated by reference numeral 16. Optical wedge 16 consists of an upper optical flat 17 and a lower optical flat 18. The lower surface of optical flat 17 is partly mirrored so as to reflect about 30% of the light impinging thereon and the upper surface of optical flat 18 is completely mirrored so as to produce a full mirror reflectance. Optical flats 17 and 18 are separated by means of shims (not shown) of suitable thickness so that the air space 19 therebetween is tapered and forms an optical wedge, the optical thickness of which is greater at one end than at the other. The light beams L' traverse an optical path through the optical system and form an interference pattern at that point where the optical thickness of the tapered air wedge and the optical thickness of film 10 do not differ in dimensions by more than a few wave lengths of light. With the thickness of the air space or wedge 19 being known at every point, as well as the indices of refraction of the materials in the optical system being known and the angles of incidence of the light on the film and wedge also being known, the interferometer may be suitably calibrated. The calibrated system is then provided with a scale 20 reading in any desired units, so that the thickness of the film 10 may be read directly from said scale by an operative whose eye is positioned at 21, the reading, of course, depending upon where the interference fringes are observed relative to said scale.

Since, in commercial film casting or extrusion operations, the films are formed in widths as great as 50 inches and more, the interferometer must be capable of being shifted laterally so that thickness readings may be taken at any desired point. Accordingly, suitable support means is provided for said optical flats to impart mobility to said device.

The support means comprises a normally horizontal base 22, having vertical plates 23 attached to the sides thereof, base 22 being pivotally mounted at 24 in vertical standards 25 (only one of which is shown), so that it may be tilted from the horizontal if desired. Standards 25 are fixed at their lower ends to a second base 26 which is provided with a set of casters 27, one at each corner, to enable the entire assembly to be shifted to any desired position on a horizontal table 28 and to be moved toward and away from an operative when readings are taken. Base 22 may be tilted for a purpose to be hereinafter described in detail but is maintained in a position, normally parallel to base 26, by a set of springs 30 suitably fixed between said base elements and mounted at the corners thereof.

Resting on vertical plates 23 is a mask, generally indicated by reference numeral 31, consisting of a horizontal plate 32 and a plate 33, disposed at an angle thereto, said plates being suitably separated so as to form a light beam sighting aperture 34. Mask 31 is pivotally mounted and freely slidable on a horizontal rod 35 by means of bearings 36 suitably attached to horizontal plate 32 by screws 37. Rod 34 is supported by arms 38 which are pivotally mounted at 40 on vertical brackets 41. The latter are fixed to horizontal table 28 by angles 42 and cross-braced by webs 43.

In order to take a reading, the operative positions his eye so that the reflection of slit 13 in the window 14 of housing 15 is visible in aperture 34 of mask 31. The entire interferometer assembly is then shifted back and forth on casters 27 until an interference pattern is sighted. The thickness of the film 10 may then be read from the location relative to scale 20 at which interference fringes are observed. The masking arrangement enables the interference fringes to be easily located and the Z-shaped path of the light beams L and L' produces fringes which are relatively close to the eye of the observer and effectively separated for every observation.

Normally, the angle of the optical flats 17 and 18 forming the air space or the optical wedge 19 of the interferometer is so chosen as to enable thickness measurements to be made over a given range of thickness gradient. In the usual commercial operations the films are sufficiently uniform in thickness so that their dimensions do not exceed the range of the scale 20 which is provided. However, when these limits are exceeded in certain emergency situations, it is important that the interferometer be capable of giving some reading. An increase in the optical wedge angle to increase the range of the instrument is not practical since an increase in the wedge angle will compress the fringes and reduce visibility over the normally utilized portion of the interferometer. A change in the operating angle of incidence of light beams L' is, however, a readily available means for extending the range of the instrument to indicate dimensions both above and below the usually encountered range. Thus, by pressing plate 22 downward at either end so as to cause it to pivot at 24 on standards 25 and to compress springs 30, the instrument is rotated through a predetermined angle from horizontal and the angle of incidence is either increased or decreased, as the case may be. This motion of the instrument effectively increases or decreases the scale value over which thickness measurements may be made. Tilted scale 20 cannot, of course, be employed to read the thickness directly as when the instrument is in a horizontal position since said scale is designed only to read thickness directly when horizontal. However, additional scales or conversion factors may be provided so that thickness may be read directly in the desired units regardless of whether the instrument is tilted to increase or decrease the angle of incidence. This novel mounting and tilting means together with the sighting means hereinbefore described renders the interferometer exceedingly flexible. The increased ease of sighting the interference fringes formed enables very accurate measurements to be taken quite rapidly and makes the continuous gauging of film thickness very practical without demanding any particular skill or training on the part of the observer or operative employing the instrument.

It is to be understood that the foregoing detailed description is given merely by way of illustration and that many variations may be made therein without departing from the spirit of our invention.

Having described our invention, what we desire to secure by Letters Patent is:

1. In an optical measuring system for measuring the thickness of a transparent sheet material without any physical contact with a surface of said sheet material including means for directing a light beam against said sheet material to produce reflected light beams from the near and far surfaces of said sheet material, the combination of an opaque window provided with a slit through which the reflected light beams pass, an optical wedge positioned to intercept the reflected light beams and a slotted mask intermediate of said window and optical wedge, said mask comprising a pair of plates and means connecting said plates, one plate being substantially parallel to the plane of the optical wedge and the other plate being spaced therefrom to form a slot and positioned at an angle to the first mentioned plate, said mask being positioned to permit the light beams reflected from only a limited portion of said wedge to pass to the eye of an observer.

2. In an optical measuring system for measuring the thickness of a transparent sheet material without any physical contact with a surface of said sheet material including means for directing a light beam against said sheet material to produce reflected light beams from the near and far surfaces of said sheet material, the combination of an opaque window provided with a slit through which the reflected light beam pass, an optical wedge positioned to intercept the reflected light beams and a slotted mask intermediate of said window and optical wedge, said mask being positioned to permit the light beams reflected from only a limited portion of said wedge to pass to the eye of an observer and mounting means for said optical wedge including a first base carrying said optical wedge, a second base supporting the first base and means pivotally connecting said bases enabling the first base to be tilted relative to the second base.

3. In an optical measuring system for measuring the thickness of a transparent sheet material without any physical contact with a surface of said sheet material including means for directing a light beam against said sheet material to produce reflected light beams from the near and far surfaces of said sheet material, the combination of an opaque window provided with a slit through which the reflected light beams pass, an optical wedge positioned to intercept the reflected light beams and a slotted mask intermediate of said window and optical wedge, said mask comprising a pair of plates and means connecting said plates, one plate being substantially parallel to the plane of the optical wedge and the other plate being spaced therefrom to form a slot and positioned at an angle to the first mentioned plate, said mask being positioned to permit the light beams reflected from only a limited portion of said wedge to pass to the eye of an observer and mounting means for said optical wedge including a first base carrying said optical wedge, a second base supporting the first base and means pivotally connecting said bases enabling the first base to be tilted relative to the second base.

4. In an optical measuring system for measuring the thickness of a transparent sheet material without any physical contact with a surface of said sheet material including means for directing a light beam against said sheet material to produce reflected light beams from the near and far surfaces of said sheet material, the combination of an opaque window provided with a slit through which the reflected light beams pass, an optical wedge supported on a substantially plane surface and adapted to be positioned as desired on said support surface so as to intercept the reflected light beams from said sheet material, a slotted mask intermediate of said window and optical wedge and means supporting said mask for free lateral and pivotal movement, said mask comprising a pair of plates, one of said plates being substantially parallel to the plane of the optical wedge and the other plate being spaced therefrom to form a slot and positioned at an angle to the first mentioned plate and means connecting said plates, said mask being positioned to permit the light beams reflected from only a limited portion of said wedge to pass to the eye of an observer, and mounting means for said optical wedge including a first base carrying said optical wedge, a second base supporting the first base and resting on the aforementioned plane surface, spring means separating said bases and means pivotally connecting said bases enabling the first base to be tilted relative to the second base against the spring pressure.

5. In an optical measuring system for measuring the thickness of a transparent sheet material without any physical contact with a surface of said sheet material including means for directing a light beam against said sheet material to produce reflected light beams from the near and far surfaces of said sheet material, the combination of an opaque window provided with a slit through which the reflected light beams pass, an optical wedge supported on a substantially plane surface and adapted to be positioned as desired on said support surface so as to intercept the reflected light beams from said sheet material, a slotted mask intermediate of said window and optical wedge and means supporting said mask for free lateral and pivotal movement, said mask comprising a pair of plates, one of said plates being substantially parallel to the plane of the optical wedge and the other plate being spaced therefrom to form a slot and positioned at an angle to the first mentioned plate and means connecting said plates, said mask being positioned to permit the light beams reflected from only a limited portion of said wedge to pass to the eye of an observer, and mounting means for said optical wedge including a first base carrying said optical wedge, a second base supporting the first base and resting on the aforementioned plane surface, spring means separating said bases and means including vertical posts on the second base in which the first base is pivotally mounted enabling the first base to be tilted relative to the second base against the spring pressure.

6. In an optical measuring system for measuring the thickness of a transparent sheet material without any physical contact with a surface of said sheet material including means for directing a light beam against said sheet material to produce reflected light beams from the near and far surfaces of said sheet material, the combination of an opaque window provided with a slit through which the reflected light beams pass, an optical wedge supported on a substantially plane surface and adapted to be positioned as desired on said support surface so as to intercept the reflected light beams from said sheet material, a slotted mask intermediate of said window and optical wedge, a laterally disposed rod carrying said mask slidably mounted thereon, said mask comprising a pair of plates, one of said plates being substantially parallel to the plane of the optical wedge and the other plate being spaced therefrom to form a slot and positioned at an angle to the first mentioned plate and means connecting said plates including a bearing through which the laterally disposed rod carrying said mask is passed, said mask being positioned to permit the light beams reflected from only a limited portion of said wedge to pass to the eye of an observer, and mounting means for said optical wedge including a first base carrying said optical wedge, a second base supporting the first base and resting on the aforementioned surface, spring means separating said bases and means including vertical posts on the second base in which the first base is pivotally mounted enabling the first base to be tilted relative to the second base against the spring pressure.

7. In an optical measuring system for measuring the thickness of a transparent sheet material without any physical contact with a surface of said sheet material including means for directing a light beam against said sheet material to produce reflected light beams from the near and far surfaces of said sheet material, the combination of an opaque window provided with a slit through which the reflected light beams pass, an optical wedge supported on a substantially plane surface and adapted to be positioned as desired on said support surface so as to intercept the reflected light beams from said sheet material, a slotted mask intermediate of said window and optical wedge, a laterally disposed rod carrying said mask slidably mounted thereon, means including arms pivotally connected to posts mounted on said plane surface carrying said rod, said mask comprising a pair of plates, one of said plates being substantially parallel to the plane of the optical wedge and the other plate being spaced therefrom to form a slot and positioned at an angle to the first mentioned plate and means connecting said plates including a bearing through which the laterally disposed rod carrying said mask is passed, said mask being positioned to permit the light beams reflected from only a limited portion of said wedge to pass to the eye of an observer, and mounting means for said optical wedge including a first base carrying said optical wedge, a second base supporting the first base and resting on the aforementioned surface, spring means separating said bases and means including vertical posts on the second base in which the first base is pivotally mounted enabling the first base to be tilted relative to the second base against the spring pressure.

JOHN H. TEEPLE.
ALLEN STRICKLER.

REFERENCES CITED

The following references are of record in the file of this patent:

UNITED STATES PATENTS

| Number | Name | Date |
|---|---|---|
| 2,253,054 | Tuttle et al. | Aug. 19, 1941 |
| 2,312,888 | Everest | Mar. 2, 1943 |
| 2,338,981 | Straub | Jan. 11, 1944 |
| 2,379,263 | Vine | June 26, 1945 |
| 2,518,647 | Teeple et al. | Aug. 15, 1950 |

FOREIGN PATENTS

| Number | Country | Date |
|---|---|---|
| 602,459 | Great Britain | May 27, 1948 |